Patented June 6, 1944

2,350,638

UNITED STATES PATENT OFFICE 2,350,638

MANUFACTURE OF ANTIMONY TRIOXIDE PIGMENTS

Ernst Podschus, Leverkusen, and Georg Meder, Cologne,Ostheim, Germany; vested in the Alien Property Custodian No Drawing. Application June 29, 1939, Serial No. 281,880. In Germany July 7, 1938

10 Claims. (Cl. 23—144)

The present invention relates to new rhombohedral antimony trioxide pigments and to a process of manufacturing the same.

Antimony trioxide exists in two modifications, the cubic and the rhombohedral forms. Both the forms are found in nature, the cubic form as senarmontite and the rhombohedral form as valentinite. It cannot be safely said which modification is the more stable. In literature there is stated that the cubic form is the more stable up to a temperature of 570° C.; in contradistinction thereto is the fact that the valentinite is found more frequently. The specific weights and the refractive indices ($\lambda$ Na) are the following:

|  | Cubic | Rhombohedral |
|---|---|---|
| Specific weight | 5.22–5.23 | 5.67 |
| Refractive index | 2.087 | 2.29 |

All artificially prepared antimony trioxide pigments are cubically crystallized. They are prepared exclusively according to a sublimation process.

By the reaction of salts of the trivalent antimony with alkalies or by hydrolysis of salts of the trivalent antimony and subsequent treatment of the products obtained by the hydrolysis with an alkaline reacting compound antimony trioxide can be prepared by means of a wet process. By means of this process, however, only coarsely crystalline or voluminous products containing water are obtained (compare Gmelin, 7th edition, vol. III, 2, page 683), the particle size of which is not favorable with regard to its pigment properties and for this reason the product could not be used as a pigment.

According to the present invention it has been found that an antimony trioxide pigment in a rhombohedral crystal from is obtained from a salt of trivalent antimony by reaction with water and subsequent treatment of the product obtained by means of hydrolysis with alkaline reacting solutions, preferably with a sodium carbonate solution. As starting material, for instance antimony trichloride, antimony tribromide, antimony triiodide and antimony sulfate come into consideration, the antimony trichloride being the most suitable and most economical.

When performing the present process it is of importance to observe during the single stages each time the most favorable conditions to obtain optimal pigment properties. The hydrolysis is advantageously performed by a quantity of water amounting to tenfold and more of the trivalent antimony salt. The reaction is performed at relatively low temperatures, i. e. between about the freezing point and about 35° C., for instance at about 15° C. while vigorously stirring, and the stirring is continued until the precipitate which first is flocky and voluminous becomes finely crystalline. At more elevated temperatures as well as after too prolonged stirring the precipitate becomes too coarse. In case too small a quantity of water is chosen the precipitation product remains voluminous and accordingly does not yield a pigment. Under the correct conditions of precipitation, as described above, a very white product of high coloring power is obtained which product still requires an alkaline after-treatment. Corresponding to its oxychloride character it contains a considerable quantity of chlorine (about 10%). When treating the product of hydrolysis with an alkaline reacting solution, preferably with a dilute sodium carbonate solution, a very white antimony trioxide pigment is obtained. Its fastness to light is still improved by heating the product obtained to temperatures above 300° C. The most favorable temperature of heating is between about 350° C. and about 420° C. since above 450° C. the product assumes a yellowish or grayish tone. Since the discoloration is made worse by an unrestricted access of oxygen, it is advisable to exclude the oxygen during the calcination treatment for instance by covering the crucible containing the antimony trioxide or by calcining in an atmosphere of an indifferent gas, for instance carbon dioxide or nitrogen.

The products obtained in accordance with the process described showing a particle size of between about 0.1$\mu$ to about 1$\mu$ have a coloring power which is about 40 to 50% stronger than that of the cubic antimony white pigments now on the market. Furthermore these products show a more intensive whiteness than the products now on the market, since by a precipitation process a higher purity is attainable than by a sublimation process. The specific weight of the product is about 5.67 and the refractive index about 2.29.

The coloring power of a white pigment is given by the difference between the refractive index of the pigment and that of the binding agent; the fact that the coloring power of the rhombohedral antimony trioxide is by 50% higher than that of the cubic form cannot be explained in all respects by the high refractive index of the rhombohedral form.

The invention is illustrated by the following examples without being restricted thereto, the parts being by weight:

Example 1

100 parts of crystallized antimony trichloride are melted and treated with 15 parts of water. The solution is cooled to 20–30° C. and mixed while stirring with 2000 parts of water of about 20° C. The vigorous stirring is continued for some minutes until the precipitate which in the beginning was flocky and voluminous has become finely crystalline. The precipitate is filtered and washed and again suspended in a solution of 20 parts of sodium carbonate in 1000 parts of water and stirred for 30 minutes. The precipitated product is filtered off, washed and dried at 100° C. The dry, very white antimony trioxide filter cake is heated at 380° C. for about 30 minutes. After cooling the pieces are ground in a wet state in a ball mill for 1 to 2 hours, filtered off and dried. The antimony white pigment is very fast to light and is distinguished by its great coloring power.

Example 2

A solution of 100 parts of antimony trichloride in 10 parts of water is added while vigorously stirring to 1500 parts of water. After a further stirring for about 12 minutes the precipitate is filtered and washed. Then the oxychloride is again suspended in a solution obtained by dilution of 50 parts of a 25% ammonia water with 950 parts of water and stirred for about 30 minutes. The suspension is filtered and washed. The filter cake is pressed and heated for about 30 minutes to 380° C. The product then is broken in pieces and ground in a ball mill in a wet state. After filtering and drying a highly valuable antimony white is obtained.

Example 3

100 parts of crystallized antimony trichloride are dissolved in 60 parts of an about 18% hydrochloric acid and added while vigorously stirring to 1500 parts of water. The solution is still stirred for about 10 minutes, the precipitate is filtered off and washed once or twice. The antimony oxychloride is again suspended in a solution of 15 parts of sodium carbonate in 1000 parts of water and stirred for about 15 minutes. The precipitate is decanted and once again treated for about 15 minutes with a solution of 10 parts of sodium carbonate in 500 parts of water while heating up to 80 to 90° C. The antimony trioxide now absolutely free from chlorine is filtered off and washed until the washing water reacts neutral. The filter cake then is heated without previously being dried under limited access of air for about 30 minutes to 400° C. The ground pigment is absolutely white, fast to light and is distinguished by its coloring power over the products in the market.

Example 4

3 parts of rhombohedral antimony trioxide and 1.5 parts of zinc white are ground in a mill with a mixture of 4.2 parts of linseed oil, 0.7 part of wood oil, 0.3 part of turpentine and 0.1 part of a dryer. The painting material obtained has excellent covering properties and is very resistant to weather.

Example 5

10 parts of rhombohedral antimony white and 4 parts of zinc white are ground with 100 parts of a nitro cellulose lacquer of the usual composition. The lacquer is distinguished by a good resistance to weather.

Example 6

60 parts of rhombohedral antimony white and 20 parts of colcothar are ground with 100 parts of oil lacquer. The lacquer is distinguished by a great brightness and resistance to weather.

Example 7

30 parts of an rhombohedral antimony white and 50 parts of zinc white are ground with 100 parts of a common oil lacquer. The painting material obtained has a good resistance to weather.

We claim:

1. Process for preparing an antimony trioxide pigment which comprises hydrolyzing a salt of trivalent antimony in which salt the antimony is present as cation at a temperature between about 0° C. and about 35° C., treating the product obtained with an aqueous alkaline reacting solution, separating the antimony trioxide from the liquid, drying and heating the product obtained to a temperature between about 300° C. and about 450° C. while excluding oxygen.

2. Process for preparing an antimony trioxide pigment which comprises hydrolyzing antimony trichloride at a temperature between about 0° C. and about 35° C., treating the product obtained with an aqueous alkaline reacting solution, separating the antimony trioxide from the liquid, drying and heating the product obtained to a temperature between about 300° C. and about 450° C. while excluding oxygen.

3. Process for preparing an antimony trioxide pigment which comprises hydrolyzing a salt of trivalent antimony in which salt the antimony is present as cation, treating the product thus obtained with an aqueous alkaline reacting solution, separating the antimony trioxide thus formed from the liquid, drying the antimony trioxide and heating it to a temperature between about 300° C. and about 450° C.

4. Process for preparing an antimony trioxide pigment which comprises hydrolyzing a salt of trivalent antimony in which salt the antimony is present as cation at a temperature between about 0° C. and about 35° C., treating the product thus obtained with an aqueous alkaline reacting solution, separating the antimony trioxide thus formed from the liquid, drying the antimony trioxide and heating it to a temperature between about 300 C. and about 450° C.

5. Process for preparing an antimony trioxide pigment which comprises hydrolyzing a salt of trivalent antimony in which salt the antimony is present as cation with an at least tenfold quantity of water at a temperature between about 0° C. and about 35° C., treating the product thus obtained with an aqueous alkaline reacting solution, separating the antimony trioxide thus formed from the liquid, drying the antimony trioxide and heating it to a temperature between about 300° C. and about 450° C.

6. Process for preparing an antimony trioxide pigment which comprises hydrolyzing a salt of trivalent antimony in which salt the antimony is present as cation with an at least tenfold quantity of water at a temperature between about 0° C. and about 35° C., treating the product thus obtained with such a quantity of an aqueous alkaline reacting solution which causes the resulting trioxide to be absolutely free from chlorine, separating the antimony trioxide thus formed from the liquid, drying the antimony trioxide and heating it to a temperature between about 300° C. and about 450° C.

7. Process for preparing an antimony trioxide pigment which comprises hydrolyzing antimony trichloride, treating the product thus obtained with an aqueous alkaline reacting solution, separating the antimony trioxide thus formed from the liquid, drying the antimony trioxide and heating it to a temperature between about 300° C. and about 450° C.

8. Process for preparing an antimony trioxide pigment which comprises hydrolyzing antimony trichloride at a temperature between about 0° C. and about 35° C., treating the product thus obtained with an aqueous alkaline reacting solution, separating the antimony trioxide thus formed from the qiluid, drying the antimony trioxide and heating it to a temperature between about 300° C. and about 450° C.

9. Process for preparing an antimony trioxide pigment which comprises hydrolyzing antimony trichloride with an at least tenfold quantity of water at a temperature between about 0° C. and about 35° C., treating the product thus obtained with an aqueous alkaline reacting solution, separating the antimony trioxide thus formed from the liquid, drying the antimony trioxide and heating it to a temperature between about 300° C. and about 450° C.

10. Process for preparing an antimony trioxide pigment which comprises hydrolyzing antimony trichloride with an at least tenfold quantity of water at a temperature between about 0° C. and about 35° C., treating the product thus obtained with such a quantity of an aqueous alkaline reacting solution which causes the resulting trioxide to be absolutely free from chlorine, separating the antimony trioxide thus formed from the liquid, drying the antimony trioxide and heating it to a temperature between about 300° C. and about 450° C.

ERNST PODSCHUS.
GEORG MEDER.